July 1, 1941.    W. C. EDMISTER ET AL    2,247,485
BUBBLE TOWER
Filed April 17, 1940

Inventors:
Wayne C. Edmister
Donon H. Pollock
By Donald H. Dickey
Attorney.

Patented July 1, 1941

2,247,485

UNITED STATES PATENT OFFICE 2,247,485

BUBBLE TOWER

Wayne C. Edmister and Doyon H. Pollock, Chicago, Ill., assignors to Standard Oil Company, Chicago, Ill., a corporation of Indiana Application April 17, 1940, Serial No. 330,020

3 Claims. (Cl. 261—114)

This invention relates to an improvement in bubble towers and, more particularly, to improved apparatus for the transfer of fluids from one tray level to another.

It is customary to construct bubble towers of a vertical series of bubble trays and to provide downspouts for conducting fluid from one tray level to the tray below. Weirs are included on each tray to establish a liquid level and seal pots below the downcomers prevent the upward passage of vapors from a lower tray to a higher tray through the downspouts.

One of the difficulties encountered in bubble towers of this type is the entrainment of vapors in the downspouts which are subsequently released underneath the stream of fluid as it enters the downspout. The released vapors build up a pressure under the stream of liquid which, if it is not released, must be overcome by increasing the head on the weir. An additional objectional feature of such entrainment is decreased effective density of the fluid from the downspout and an increased volume of fluid handled for a given efflux of fractionated product. It frequently happens that the downspouts fill up with fluid and cause flooding of the tower with accompanying imperfect fractionation. Ordinarily this can be corrected only by decreasing the volume of fluid to be fractionated, thereby decreasing its effective capacity, or by enlarging the weirs and downspouts which usually entails the use of a tower of greater diameter, with increased construction costs.

It is an object of this invention to provide an improved bubble tower wherein flooding is prevented or greatly decreased. Another object of our invention is to provide increased capacity in a bubble tower by simple and inexpensive means. A further object is to provide means for the venting of entrained vapors from the fluid in a bubble tower downspout. Further objects and advantages will become apparent as the description of our invention proceeds, read in conjunction with the drawing, which forms a part of this specification.

Figure 1:
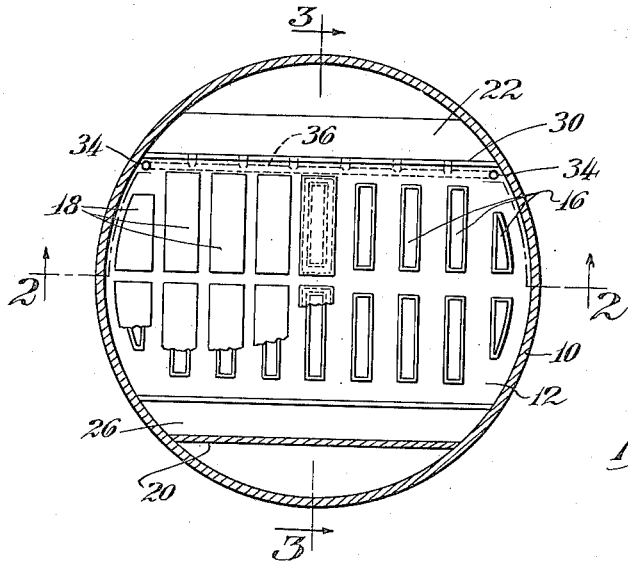
Figure 1 is a horizontal sectional view of a portion of a bubble tower embodying our invention.
Figure 2:
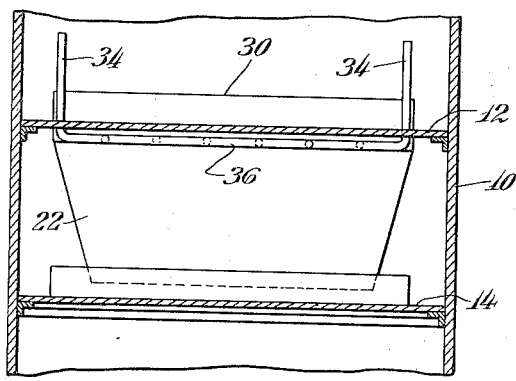
Figure 2 is a vertical sectional view taken along the line 2—2 of Figure 1.
Figure 3:
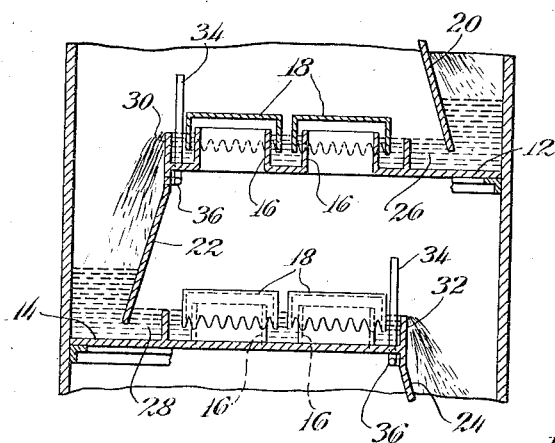
Figure 3 is a vertical sectional view taken along the line 3—3 of Figure 1.

Illustrating one preferred embodiment of our invention is a conventional cross flow bubble plate. The bubble tower is defined by circular walls 10, in which are located a plurality of conventional bubble plates 12 and 14. Bubble plates 12 and 14 are provided with vapor risers 16 and bubble caps 18. As shown, the flow of fluid is across bubble plate 12 from downspout 20 to downspout 22 and thence across bubble plate 14 to downspout 24. Sealpots 26 and 28 at the lower ends of downspouts 20 and 22 respectively maintain pools of liquid to seal the outlets of the downspouts against the passage of vapors upwardly therethru from a lower to a higher tray. Weir 30 on plate 12 and weir 32 on plate 14 adjacent to downspouts 22 and 24 establish a normal fluid level for the tray.

The weirs on a bubble plate are always restricted by the tower shell or in the case of a two or more pass tray by an opposing weir. This situation does not allow absorbed or entrained vapors to leave the downspout readily, which increases the volume of fluid handled and decreases the effective density of the fluid in the downspout, and if allowed to continue will in all probability cause the tower to flood, with accompanying improper fractionation if the tower is operating near capacity. Observation of an ordinary circular weir has shown that pressure builds up between the sheet of flowing fluid and the weir and forces the flowing fluid upward to a point where a vortex is formed.

To avoid these difficulties, we install vents 34 in the downspouts by which the absorbed or entrained vapors are vented to the spaces above the trays on which they are installed. Each vent line 34 terminates at its lower end in the downspout below the level of the plate and extends horizontally to a position near the bubble tower wall where it rises through the plate to terminate at its upper end above the liquid on the plate thereby producing minimum interference with the flow of liquid over the weir and plate. Such vents relieve any pressure built up between the flowing fluid and the weir, which pressure has the effect of increasing the required head on the weir, so that a lower liquid level may be maintained over the weir than is possible in an unvented weir.

We prefer to extend the vent line below the bubble plate in order to avoid so far as possible any interference with the flow of fluids across the bubble plate and the weir. Also, and for the same reason, we prefer to locate the vent lines as close to the outer edges of the weir and as near the tower wall as is practical and feasible. The lower opening or openings of the vent line are located in the depending apron of the downspout directly beneath the weir to remove the entrained vapors which accumulate chiefly at that point and which, as has been pointed out, may cause "flooding" of the tower by increasing the volume of fluid in the downspout.

Although we have illustrated our invention by the use of only two vents we do not intend to be limited thereby, since two or more vents may be manifolded to one or more vent lines 36 with equal applicability, depending only upon such factors as the tower capacity, the vapor entrainment in the fluid, etc. Generally speaking, vents should be installed in such arrangement as to avoid any possible tendency to cause "swirling" or undesirable eddy currents in the liquid flowing through the tower.

We have also illustrated our invention by a bubble tower having a conventional cross flow. We do not intend to be restricted thereto since our invention is equally applicable to conventional two pass flow, in which fluid passes from one tray through a central downspout to the next lower tray, and down through downspouts at the outer periphery of the tray. Our invention is applicable to any bubble tower arrangement employing trays, weirs, and downspouts, wherein it is desirable to reduce the amount of absorbed or entrained vapors with the downspout fluid.

We claim:

1. In a fractionation tower comprising a bubble plate, a bubble cap mounted on said bubble plate, a weir mounted on said bubble plate to control the liquid level thereon, and a downspout depending from said bubble plate and associated with said weir, the improvement comprising a vent line passing thru said bubble plate, terminating below said bubble plate within said downspout immediately adjacent to the bottom of said weir, and terminating above said bubble plate at a level above the top of said weir.

2. In a fractionating tower comprising a bubble plate, a bubble cap mounted on said bubble plate, a weir mounted on said bubble plate to control the liquid level thereon, and a downspout depending from said bubble plate and associated with said weir, the improvement comprising a vent line terminating below said bubble plate within said downspout immediately adjacent to the bottom of said weir, passing horizontally and below said bubble plate and parallel to said weir to a point adjacent to the walls of said tower, extending upwardly thru said bubble plate and terminating above said bubble plate at a level above the top of said weir.

3. In a fractionating tower comprising a bubble plate, a bubble cap mounted on said bubble plate, a weir mounted on said bubble plate to control the liquid level thereon, and a downspout depending from said bubble plate and associated with said weir, the improvement comprising a vent line having a plurality of inlets terminating below said bubble plate within said downspout immediately adjacent to the bottom of said weir and manifolded to a single line, said single line passing horizontally and below said bubble plate and parallel to said weir to a point adjacent to the walls of said tower, extending upwardly thru said bubble plate and terminating above said bubble plate at a level above the top of said weir.

WAYNE C. EDMISTER.
DOYON H. POLLOCK.